United States Patent [19]

Hughes et al.

[11] Patent Number: 5,678,862

[45] Date of Patent: Oct. 21, 1997

[54] INDICATING DEVICE

[75] Inventors: Edward John Langford Hughes, Gnarwarre; Karen Ann Yeilds, Narre Warren South, both of Australia

[73] Assignee: No. 1 Little Collins St. Pty., Ltd., Melbourne, Australia

[21] Appl. No.: 339,728

[22] Filed: Nov. 14, 1994

[30] Foreign Application Priority Data

Nov. 12, 1993 [AU] Australia ................ 50679/93

[51] Int. Cl.⁶ .................................................. B42D 15/00
[52] U.S. Cl. ........................ 283/65; 285/2; 235/88 R
[58] Field of Search ................... 283/2, 3, 65, 115; 40/111, 115, 113, 114; 235/88 RC, 88 R

[56] References Cited

U.S. PATENT DOCUMENTS

| | | |
|---|---|---|
| 1,942,754 | 1/1934 | Heyssier . |
| 2,076,242 | 4/1937 | Marquis . |
| 2,481,067 | 9/1949 | Benner et al. . |
| 2,542,943 | 2/1951 | Reiner . |
| 2,650,764 | 9/1953 | Pierszel . |
| 3,995,379 | 12/1976 | Werber . |
| 4,772,780 | 9/1988 | Reed et al. . |
| 5,189,285 | 2/1993 | Young, Jr. . |

FOREIGN PATENT DOCUMENTS

| | | |
|---|---|---|
| 128842 | 8/1948 | Australia . |
| 243038 | 10/1960 | Australia . |
| 250846 | 2/1963 | Australia . |
| 249592 | 5/1963 | Australia . |
| 262888 | 11/1965 | Australia . |
| 0196869 | 10/1986 | European Pat. Off. . |
| 0142892 | 5/1989 | European Pat. Off. . |
| 0372607 | 6/1990 | European Pat. Off. . |

OTHER PUBLICATIONS

Instructions "The Weems E-6B Aerial Navigation Computer Instruction Manuel", pp. 4-8 & 20-21. No publication date given.

Primary Examiner—Willmon Fridie, Jr.
Attorney, Agent, or Firm—Sughrue, Mion, Zinn, Macpeak & Seas, PLLC

[57] ABSTRACT

An indicating device (2) for indicating dates upon which events such as procedural steps should take place, said device (2) comprising a first disc (4) having a first field )24) which includes a plurality of first dates and at least one second field (26) which includes a plurality of second dates, the positions of said fields (24, 26) having a predetermined relationship to one another on the first disc, a second disc (6) pivotally connected for relative rotary movement to the first disc (4), the second disc having a first window (12) which can be aligned with a selected one of the first dates and a second window (14, 16, 18, 20) having a predetermined position relative to the first window, the arrangement being such that when the first window is aligned with one of the first dates, the second window is aligned with a second date in the second field thereby indicating the date upon which an event should take place consequent upon selection of one of the first dates.

16 Claims, 3 Drawing Sheets

INDICATING DEVICE

This invention relates to an indicating device.

More particularly, the invention relates to an indicating device for indicating dates upon which events should take place.

It is an object of the invention to provide a simple, reliable and inexpensive device for indicating dates upon which certain events should take place relative to a predetermined time. Typically the device could be used to indicate when a procedural step or the like should take place at a future date relative to the present date.

According to the present invention there is provided an indicating device for indicating dates upon which events should take place, said device comprising a first member having a first field which includes a plurality of first dates and at least one second field which includes a plurality of second dates, the positions of said fields having a predetermined relationship to one another on the first member, a second member connected for relative movement to the first member, said second member having a first window which can be aligned with a selected one of the first dates and a second window having a predetermined position relative to the first window, the arrangement being such that when the first window is aligned with said one first dates, the second window is aligned with a second date in the second field thereby indicating the date upon which an event should take place consequent upon selection of said one first date.

Preferably, the device includes pivot means to interconnect the first and second members for relative rotation about an axis and wherein the first field comprises a part of a first annular area centred on said axis and the second field comprises a second annular area centred on said axis.

Preferably, the first and second annular areas have different radii whereby the first and second windows cannot overlie the second and first fields respectively.

The invention will now be further described with reference to the accompanying drawings, in which.

Figure 1:
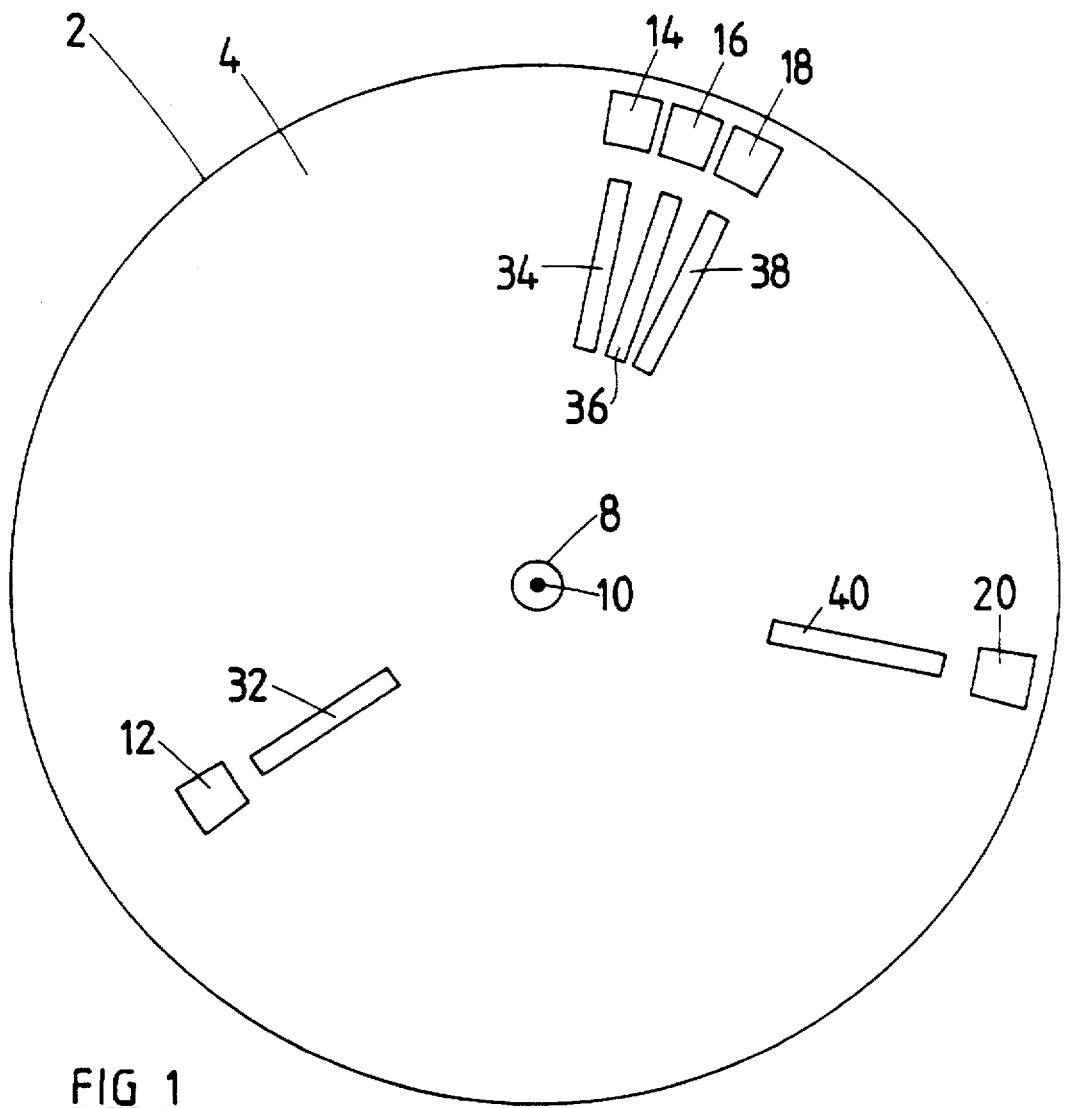
FIG. 1 shows a frontal view of the device of the invention.
Figure 2:
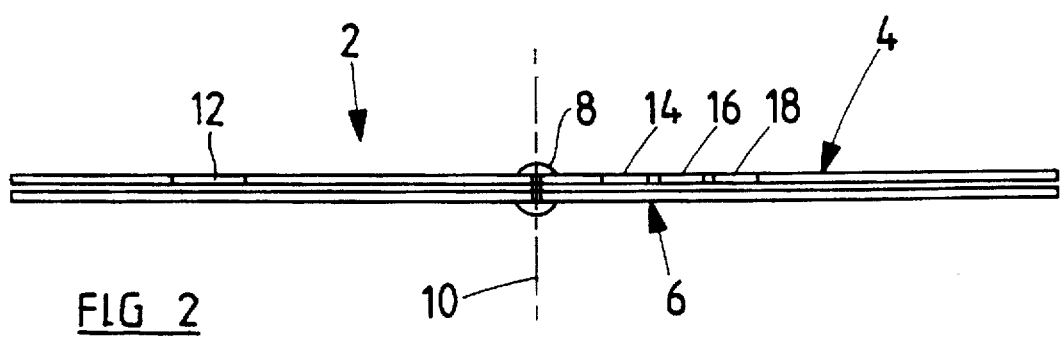
FIG. 2 is a side view of the device.

The indicating device 2 shown in the drawings is for the purpose of assisting, indicating or reckoning dates which are dependent upon a selected date. In the illustrated arrangement, the device is particularly arranged for indicating the dates by which certain procedural steps need to be made in relation to an International Patent Application filed under the PCT. The device 2 includes a first disc 4, a second disc 6 and a pin 8 for pivotally connecting the discs 4 and 6 together for rotation about an axis 10. The first disc 4 includes first, second, third, fourth and fifth windows 12, 14, 16, 18 and 20 respectively, which enable the user to look through them to parts of the upper face 22 of the second disc 6.

Figure 3:
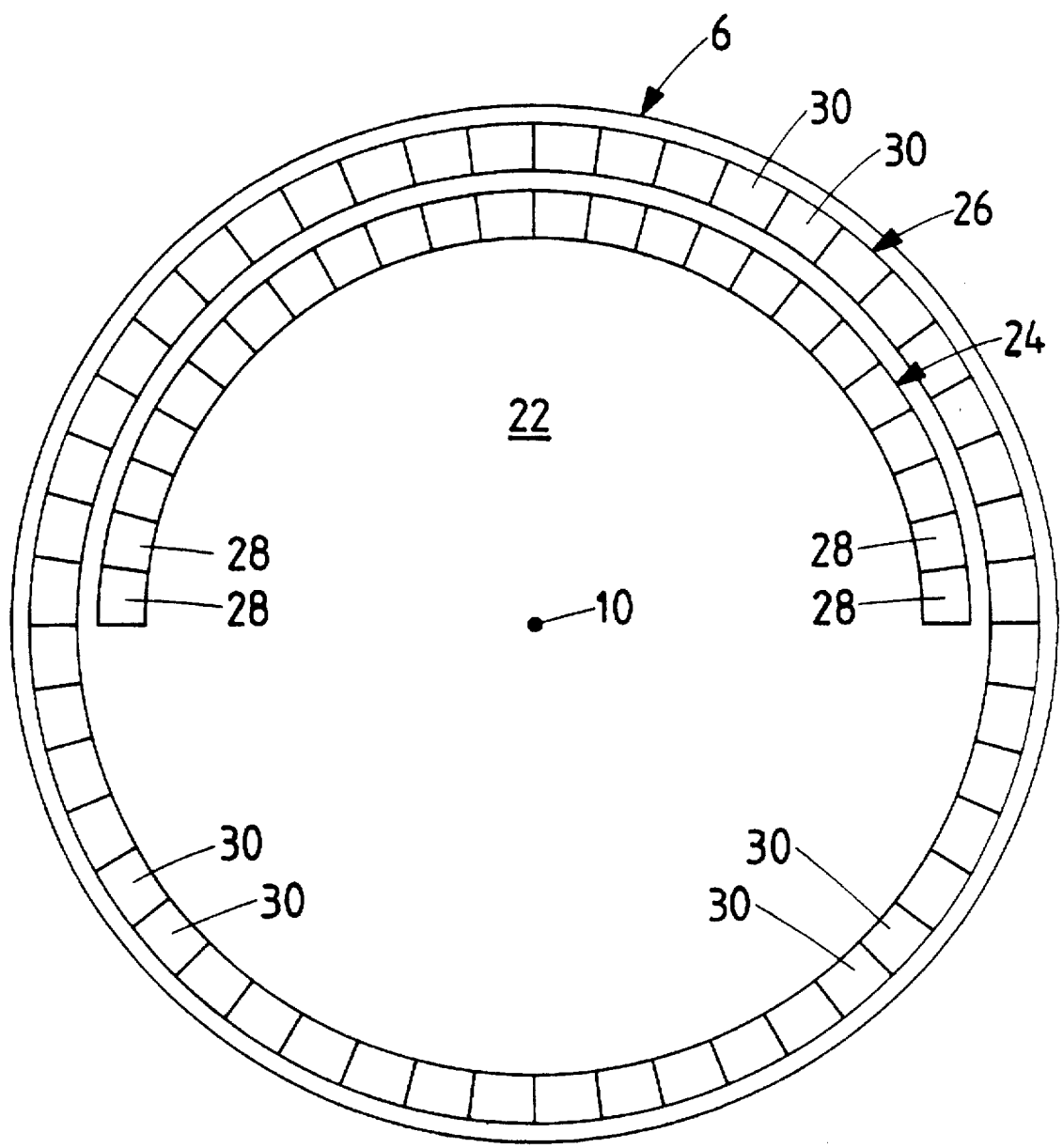
FIG 3 shows part of the device with date fields marked thereon.

FIG. 3 illustrates the preferred arrangement of the upper face 22 of the second disc 6. The face 22 includes a first date field 24 and a second date field 26. The first date field 24 comprises part of an annular region of the face 22, centred on the axis 10. Similarly, the second field 26 comprises an annular area of the face 22 but in this case the annular area is complete. The first field 24 has a smaller radius than the second field 26. The first field 24 is divided into a plurality of date cells 28 and the second field 26 is also divided into a plurality of date cells 30. In the illustrated arrangement, there are twenty-four date cells 28 in the first field 24 and forty-eight of the date cells 30 in the second field 26.

Figure 4:
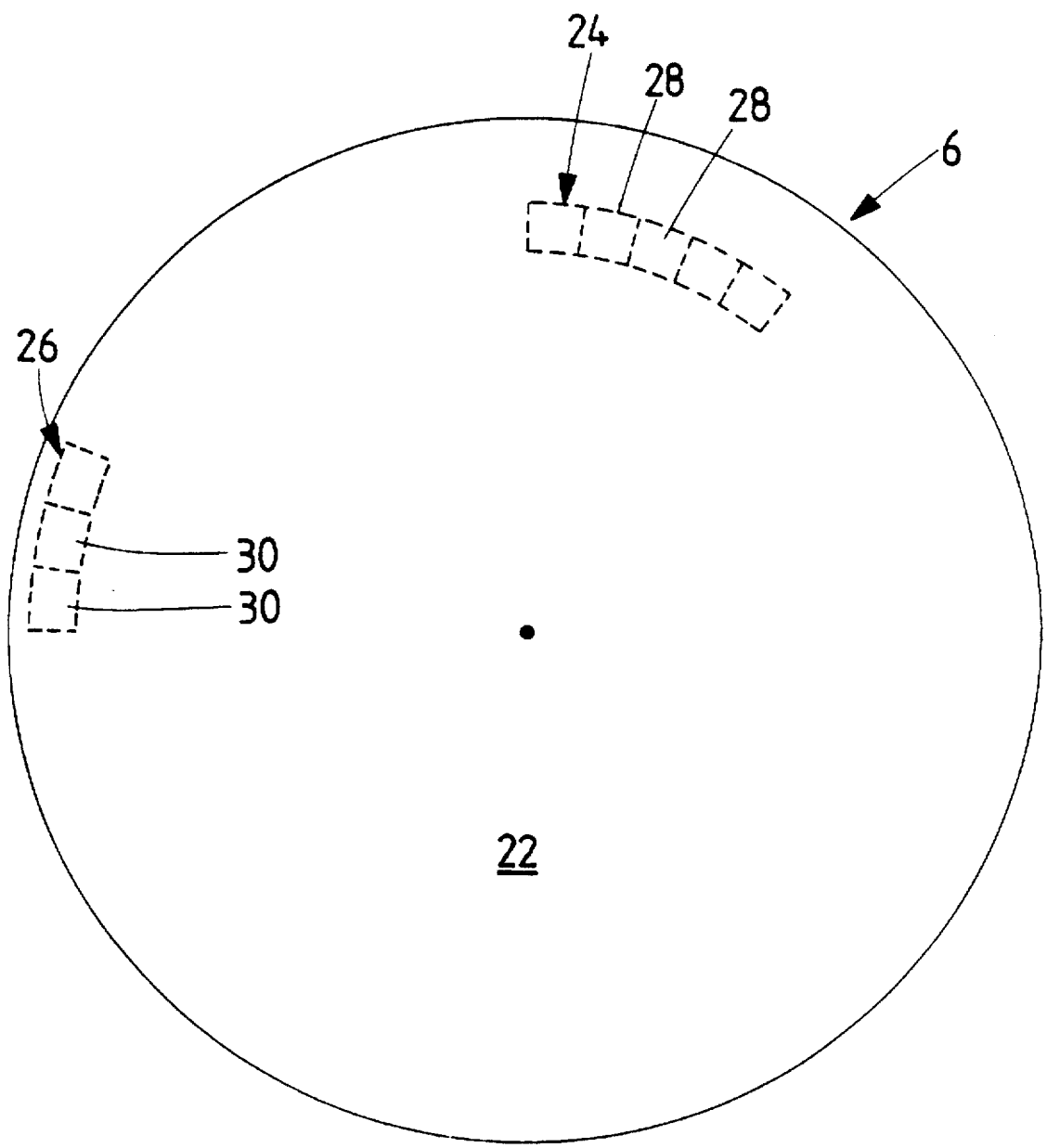
FIG 4 shows the date fields and dates marked therein.

FIG. 4 illustrates one example of dates marked in the date cells 28 and 30 of the field 24 and 26 respectively.

In the complete device, the first window 12 is spaced from the axis 10 by a radial distance which is the same as the radial spacing of the first field 24 from the axis 10. The width of the first window 12 (as measured in the circumferential direction) is the same as each of the date cells 28. In this way the first disc 4 can be rotated so that the first window 12 is aligned with one of the cells 28 of the first field 24.

The second, third, fourth and fifth windows 14, 16, 18 and 20 have the same radius relative to the axis 10 as the second field 28 and the widths of these windows are again the same as the widths of the date cells 30.

With this arrangement, the first window 12 can be aligned with a selected cell 28 in the first field and this will cause each of the second, third, fourth and fifth windows 14, 16, 18 and 20 to be aligned with predetermined date cells 30 in the second field 26.

In the preferred arrangement, the date cells 28 show month and year dates indicative of the priority date claimed in an International Patent Application. It is preferred that the words "priority date" or the like be printed on the first disc 4 in a first information field 32 radially adjacent to the window 12. The second window 14 will reveal a month and year in a date cell 30 which is always 18 months in advance of the date selected by the first window 12. The date revealed in the second window 14 thus indicates the approximate publication date of the International application and it is preferred that the word "publication" be printed on the first disc 4 in a second information field 34 radially adjacent to the second window 14. The third and fourth windows 16 and 18 have the same spacing as the cells 30 in the second field 26. Thus, the second, third and fourth windows 14, 16 and 18 reveal dates in the second cells 30 which are 18 months, 19 months and 20 months respectively from the priority date revealed in the selected first cell 28. The third window 16 thus indicates a date by which a Demand for International Preliminary Examination must be filed. It is preferred that the words "Demand Date" be printed on the first disc 4 in a third information field 36 radially adjacent to the third window 16. The fourth window 18 reveals a date in a date cell 30 which is 20 months ahead of the priority date indicated in the first window 12. Accordingly, the fourth window 18 indicates the time by which national phase entries should be filed where required. It is accordingly preferred that the words "20 month date" be printed on the first disc 4 in a fourth information field 38 radially adjacent to the window 18.

The fifth window 20 again overlies the date cells 30 in the second field 26 but this time it is spaced so that it indicates dates which are 30 months ahead of the priority dates selected by the first window 12. Thus, the fifth window 20 indicates the date by which national phase entries should be made following International Preliminary Examination. Accordingly, the words "30 month date" are preferably printed on the first disc 4 in a fifth information field 40 which is radially adjacent to the fifth window 20.

It will be appreciated that the illustrated indicating device can be used to quickly indicate most significant dates applicable to procedural aspects of an International patent application commencing from the priority date. Such a device would be useful to patent attorneys and patent applicants for quickly reckoning the relevant dates.

The outer faces of the first and second discs 4 and 6 may be printed with additional explanatory material and/or promotional material.

In an alternative embodiment, the second, third and fourth windows 14, 16 and 18, which are closely spaced to one another, could be merged so as to comprise a single composite window. The three separate information fields 34, 36 and 38 would be provided so as to indicate the significance of the three dates which would appear in the composite window. In another embodiment the windows could be adjacent to or form part of the periphery of the disc 6.

Many modifications will be apparent to those skilled in the art without departing form the spirit and scope of the invention.

What is claimed is:

1. An indicating device for indicating dates by which procedural events in prosecuting an International Patent Application should take place, said device comprising first and second members which are connected together for rotation about an axis, the first member having a first field which comprises a first annular area centered on said axis at a first radius, said first field including a plurality of first dates representative of the priority dates of an International Patent Application, said first member having a second field which comprises a second annular area centered on said axis at a second radius, said second field including a plurality of second dates representative of dates by which National Phase entries should be made, the first radius being smaller than the second radius, the second member having first, second and third windows each dimensioned for display of a single date on said first member, the first window being at said first radius and being alignable with a selected one of said first dates, first information means associated with said first window to indicate that the selected first date is the priority date of an International Patent Application, said second and third windows being both at said second radius and being circumferentially spaced relative to the first window and to each other, second and third information means associated with said second and third windows, respectively, to indicate that the second dates exposed therein are the dates by which National Phase entries should be made, which dates are dependent upon the priority date selected in the first window.

2. An indicating device as claimed in claim 1, wherein the second member includes a fourth window adjacent to the second window for exposing therein only one of said second dates and fourth information means associated with said fourth window to indicate that the second date exposed therein is the date by which a Demand for International Preliminary Examination should be made.

3. An indicating device as claimed in claim 2, wherein the second member includes a fifth window adjacent to the fourth window for exposing therein only one of said second dates and fifth information means associated with said fifth window to indicate that the second date exposed therein is the date of publication of the International Patent Application.

4. An indicating device as claimed in claim 3, wherein said third, fourth and fifth windows are separate.

5. An indicating device as claimed in claim 1, wherein said first and second members comprise first and second opaque discs and said windows comprise separate holes through the second disc.

6. An indicating device as claimed in claim 1, wherein each of the first and second dates comprises a month and a year.

7. An indicating device as claimed in claim 1, wherein the second field extends through 360°.

8. An indicating device as claimed in claim 7, wherein the first field extends through 180°.

9. An indicating device for indicating dates by which procedural events in prosecuting an International Patent Application should take place, said device comprising first and second members which are connected together for rotation about an axis, the first member having a first field which comprises a first annular area centered on said axis at a first radius, said first field including a plurality of first dates representative of the priority dates of an International Patent Application, said first member having a second field which comprises a second annular area centered on said axis at a second radius, said second field including a plurality of second dates representative of dates by which National Phase entries should be made, the second member having first, second and third windows each dimensioned for display of a single date on said first member, the first window being at said first radius and being alignable with a selected one of said first dates, first information means associated with said first window to indicate that the selected first date is the priority date of an International Patent Application, said second and third windows being both at said second radius and being circumferentially spaced relative to the first window, second and third information means associated with said second and third windows respectively to indicate that the second dates exposed therein are the dates by which National Phase entries should be made, which dates are dependent upon the priority date selected in the first window and wherein the first and second radii are different so that said first dates cannot be exposed in said second and third windows.

10. An indicating device as claimed in claim 9, wherein the second member includes a fourth window adjacent to the second window for exposing therein only one of said second dates and fourth information means associated with said fourth window to indicate that the second date exposed therein is the date by which a Demand for International Preliminary Examination should be made.

11. An indicating device as claimed in claim 10, wherein the second member includes a fifth window adjacent to the fourth window for exposing therein only one of said second dates and fifth information means associated with said fifth window to indicate that the second date exposed therein is the date of publication of the International Patent Application.

12. An indicating device as claimed in claim 11, wherein said third, fourth and fifth windows are separate.

13. An indicating device as claimed in claim 9, wherein said first and second members comprise first and second opaque discs and said windows comprise separate holes through the second disc.

14. An indicating device as claimed in claim 9, wherein each of the first and second dates comprises a month and a year.

15. An indicating device as claimed in claim 9, wherein the second field extends through 360°.

16. An indicating device as claimed in claim 15, wherein the first field extends through 180°.

\* \* \* \* \*